United States Patent [19]

Eriksen et al.

[11] Patent Number: 4,499,501
[45] Date of Patent: Feb. 12, 1985

[54] IMAGE TRANSFER METHOD AND APPARATUS

[75] Inventors: Joern B. Eriksen, Oregon City; Pierre Radochonski, Lake Oswego, both of Oreg.

[73] Assignee: Tektronix, Inc., Beaverton, Oreg.

[21] Appl. No.: 413,858

[22] Filed: Sep. 1, 1982

[51] Int. Cl.³ .............................................. H04N 1/22
[52] U.S. Cl. .................................... 358/302; 358/901
[58] Field of Search ............... 358/302, 332, 345, 346, 358/347, 901; 346/110 R

[56] References Cited

U.S. PATENT DOCUMENTS 3,821,796  6/1974  Ernstoff et al. ........................ 358/12
3,829,613  8/1974  Melchior ............................... 358/81
4,017,891  4/1977  Helmberger et al. ................ 358/332

Primary Examiner—Howard W. Britton
Assistant Examiner—Victor R. Kostak
Attorney, Agent, or Firm—John H. Bouchard; Robert S. Hulse; John Smith-Hill

[57] ABSTRACT

An image quality enhancement scheme is disclosed wherein the image information associated with each line of an image source is transferred to one line of an image receiving medium a plurality of times, the quality of the image information transferred to one line of the image receiving medium gradually improving following each subsequent transfer. A fiber optic cathode ray tube (CRT) transfers the image information to the image receiving medium. An electron beam generator in the CRT traces a plurality of scan lines on the inner faceplate of the CRT. The image receiving medium scrolls across the face of the CRT in synchronism with the trace of each of the scan lines on the inner faceplate thereof. The image information associated with each line of the image source is transferred to the one line of the image receiving medium via the trace of each of the plurality of scan lines. Consequently, following each such transfer via the trace of each corresponding scan line, the quality of the image recorded on said one line of the image receiving medium is gradually improved.

5 Claims, 13 Drawing Figures

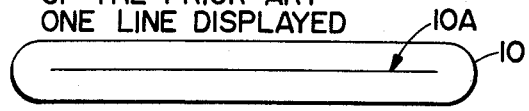
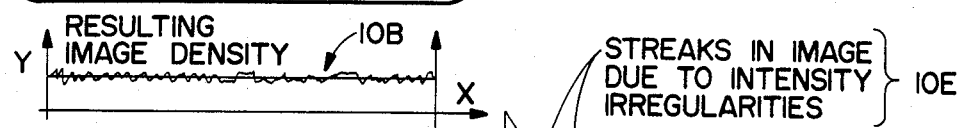
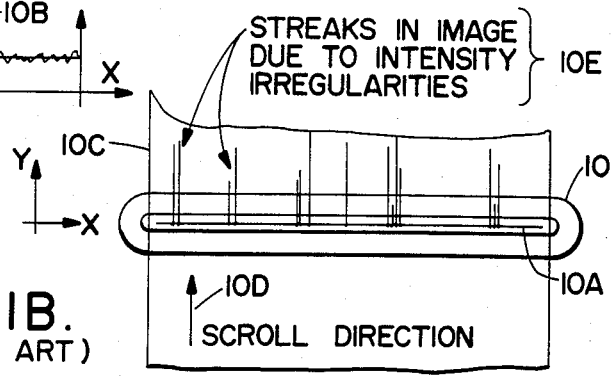
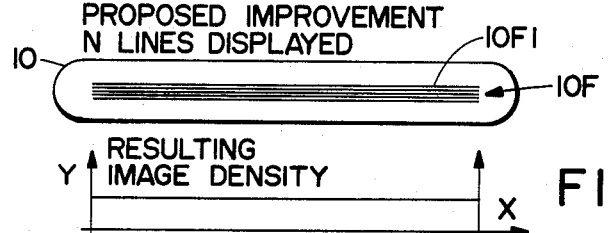
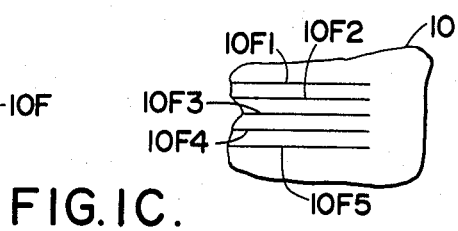
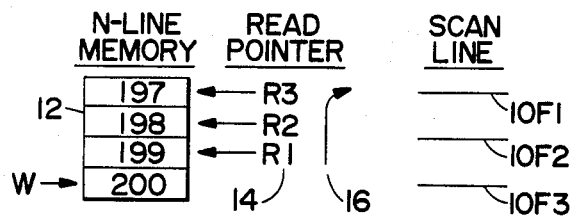
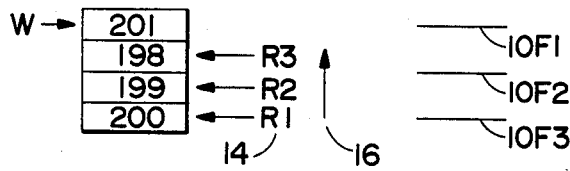
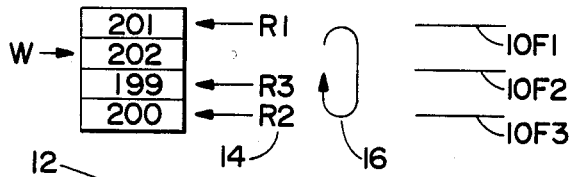
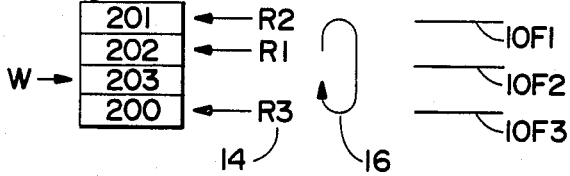

IMAGE TRANSFER METHOD AND APPARATUS

BACKGROUND OF THE INVENTION

1. Field of the Invention

This invention relates to an image transfer method and apparatus and, specifically, to an improvement therein for improving the quality of an image transferred to an image receiving medium.

2. Description of the Prior Art

Various apparatus have been used in the prior art to transfer an image from an image source to an image receiving medium. For example, a fiber optic cathode ray tube (CRT) is used to transfer an image from a graphics display terminal or a facsimile to a photo-sensitive paper medium. The image on the image source is scanned, line-by-line, and signals are generated in response thereto representative of the brightness of the image. In the above example, an electron beam generating apparatus in the fiber optic CRT, responsive to the signals from the image source, generates electron beams in response thereto, the intensity of the beams varying in accordance with the signals from the image source. The intensity-varying electron beams in the CRT are deflected from one end of the tube to the other and impinge upon the inner surface of the CRT simultaneously therewith. The image receiving medium is scrolled across the face of the fiber optic CRT, in a direction substantially perpendicular to the direction of deflection of the electron beam. The rate at which the image receiving medium is scrolled across the face of the CRT is synchronized with the rate at which the image on the image source is scanned. While the image receiving medium is being scrolled across the face of the fiber optic CRT and while the intensity-varying electron beam impinges upon the inner surface of the CRT, the image from the image source is recorded, line-by-line, onto the image receiving medium.

However, the prior art fiber optic CRT's utilized a one-line scan technique wherein the electron beam, responsive to the above-mentioned signals, scanned along one line across the inner surface of the fiber optic CRT to transfer each line of the image to the image receiving medium. Furthermore, imperfections exist on the inner faceplate of the fiber optic CRT and in the fiber optic faceplate itself. These imperfections may include any one or more of the following: the inner faceplate includes a multitude of phosphor particles and the density of the phosphor particles on the inner faceplate may vary; holes may exist between adjacent ones of said particles; burn spots may exist at various locations on the inner faceplate; and various ones of said particles may have differing emission characteristics. Fibers in the fiber optic faceplate may be irregularly distributed and may have varying transmission characteristics. When the electron beam scans along said one line and across the imperfections, blank spots or gaps appear on said image receiving medium at locations corresponding to the location of said imperfections along said one line. As a result, streaks may appear on the image receiving medium at said locations.

To further illustrate this problem with the prior art, reference is directed to FIGS. 1a and 1b.

In FIG. 1a, a faceplate of the fiber optic CRT 10 is illustrated wherein the electron beam scans along said one line 10a on the inner faceplate thereof. As a result of the imperfections which exist, after the electron beam scans along said one line, variations in image density 10b appear on the image receiving medium at positions corresponding to the location of the imperfection along said one line.

In FIG. 1b, the fiber optic faceplate 10 is again illustrated in conjunction with the one scan line 10a. *The image receiving medium 10c scrolls in a direction indicated by the arrow 10d.* Since the electron beam continuously scans along said one line 10a and across the imperfections which exist along said one line, streaks 10e appear on the image receiving medium 10c.

SUMMARY OF THE INVENTION

It is a primary object of the present invention to minimize or eliminate the image quality deterioration problem of the prior art.

It is another object of the present invention to minimize or eliminate the image quality deterioration problem of the prior art by utilizing a multi-line scan technique in lieu of the one-line scan technique of the prior art.

It is still another object of the present invention to minimize or eliminate the image quality deterioration problem of the prior art by successively and repeatedly recording a plurality of lines of the image source onto a corresponding plurality of lines of the image receiving medium a multiple number of times.

These and other objects of the present invention are accomplished by utilizing a multi-line scan technique in lieu of the one-line scan technique of the prior art. Each line of image source is scanned only once. However, when one of the lines of the image source undergoes the scan, a signal is generated representative of the image information associated with said one of the lines. The signal varies the intensity of the electron beam generated in the fiber optic CRT. One line of the image receiving medium coincides with a first scan line of the fiber optic CRT. While said one line coincides with said first scan line, the intensity-varying electron beam is deflected, from one end of the tube to the other, within the fiber optic CRT. During the deflection, the electron beam scans along said first scan line on the inner surface of the CRT and records the image information associated with said one of the lines of the image source onto sid one line of the image receiving medium. When the image information associated with said one of the lines of the image source has been ransferred to said one line of the image receiving medium via said first scan line, the electron beam retraces to its original starting point, the vertical position being incremented by a certain factor. Then, the electron beam is again deflected from said one end of the tube to the other, the image information associated with a prior, adjacent line of the image source being transferred to said image receiving medium via a second scan line. Image information associated with other prior, adjacent lines of the image source are transferred to other prior, adjacent lines of said image receiving medium via a third and subsequent scan line. When the image information associated with said one and prior, adjacent lines of the image source has been transferred to said one and prior, adjacent lines of the image receiving medium via said first and subsequent scan lines, the image receiving medium is scrolled across the face of the fiber optic CRT such that said one line of the image receiving medium coincides with said second scan line, in lieu of said first scan line. At this point, the image information associated with said one line of the image source is transferred to said one line of the image receiving medium via said second scan line, in lieu of said first scan line. Image information associated with the prior, adjacent line of the image source is transferred to the image receiving medium via a third scan line, in lieu of said second scan line. In the meantime, new image information is transferred to the image receiving medium via said first scan line.

In fact, the electron beam is deflected a multiple number of times via a respective multiple number of scan lines along the inner faceplate of the fiber optic CRT for the purpose of recording the image information associated with said one and prior, adjacent lines of the image source onto sid one and prior lines of the image receiving medium.

If an imperfection exists at a particular position along the first scan line within the fiber optic CRT, when the electron beam scans along the first scan line, a blank spot or gap will be produced on the image receiving medium at a location corresponding to said particular position along the first scan line. However, another imperfection will most likely not exist at a position corresponding to said particular position along the second or subsequent scan lines. As a result, when the electron beam scans along the second or subsequent scan lines, the visual effect of the blank spot or gap on the image receiving medium, generated from the first scan line, will be lessened, if not completely eliminated. Consequently, a streak on the image receiving medium will not be created at a position corresponding to said particular position along the first scan line.

By using the multi-line scan technique of the present invention, the streaks 10e produced on the image receiving medium will tend to disappear.

Further scope of applicability of the present invention will become apparent from the description given hereinafter. However, it should be understood that the details of the description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

A full understanding of the present invention will be obtained from the detailed description given hereinbelow and the accompanying drawings which are given by way of illustration only, and thus are not limitative of the present invention, and wherein:

FIGS. 1a–1b illustrate the prior art one-scan line fiber optic CRT and the image quality deterioration problems encountered therewith.

FIG. 1c illustrates a multi-scan line fiber optic CRT of the present invention and the resultant elimination of the image quality deterioration problem of the prior art.

FIGS. 2a–2d illustrate the multi-scan line fiber optic CRT of FIG. 1c and the manner by which the image information associated with each line of the image source, stored in a line location of a multi-line memory, is repeatedly and successively transferred to one line of the image receiving medium via each of the multiple number of scan lines of the fiber optic CRT.

DETAILED DESCRIPTION OF THE PREFERRED EMBODIMENT

Figure 3:
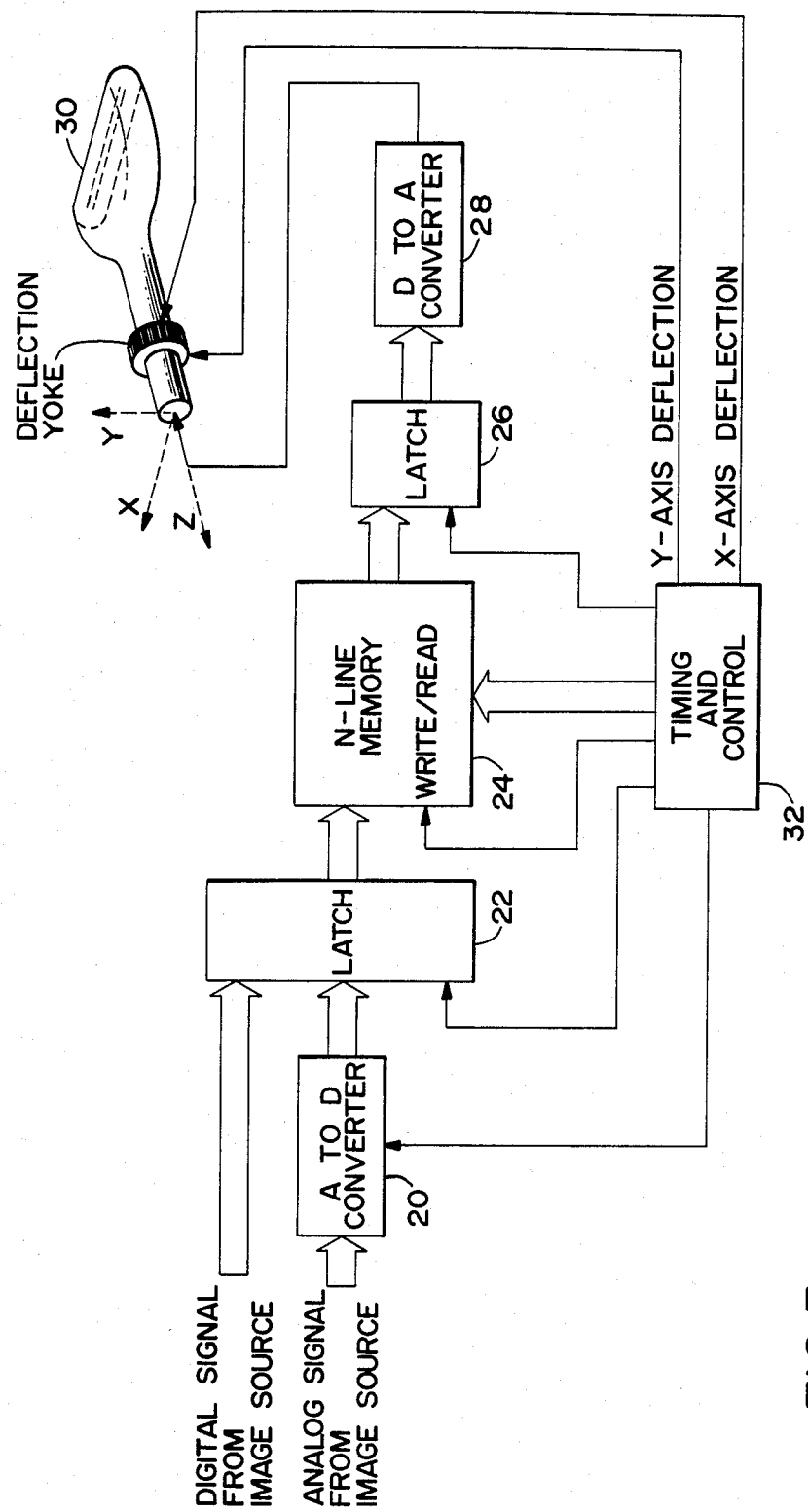
FIG. 3 illustrates a basic system block diagram of the present invention.

Referring to FIG. 1c, a basic element of the present invention is illustrated. The electron beam generated by the fiber optic CRT traces a multiple number of scan lines 10f on the inner faceplate 10 thereof. Each line of the image source is transferred to one line of the image receiving medium via each of the multiple number of scan lines.

It was stated, with reference to FIG. 1b, that, for each line of the image source, one scan line 10a was traced on the inner faceplate of the fiber optic CRT 10, the image information associated with each line of the image source being transferred to the image receiving medium via said one scan line 10a. The present invention shown in FIG. 1c represents an improvement over the prior art of FIGS. 1a and 1b, in that, in lieu of the one line scan technique of FIG. 1b, a multi-line scan technique is utilized wherein the image information associated with each line of the image source is successively and repeatedly transferred to the image receiving medium 10c via each of the multiple number of scan lines 10f.

For example, there may be five scan lines as shown in FIG. 1c, a lowermost scan line 10/5, a second lowermost scan line 10/4, third, fourth, and fifth lowermost scan lines 10/3–10/1, respectively. The fifth line of the image receiving medium coincides with the fifth scan line 10/5. The electron beam traces the lowermost scan line 10/5, transferring the image information associated with a fifth line of the image source to a fifth line of the image receiving medium via the lowermost scan line 10/5. Following the trace of the lowermost scan line, the electron beam traces the fourth through first scan lines 10/4–10/1 transferring the image information associated with the fourth through the first lines of the image source to the fourth through first lines of the image receiving medium via said fourth through first scan lines 10/4–10/1. The electron beam retraces to its original position. The image receiving medium 10c scrolls across the face of the CRT in synchronism with the retrace of said electron beam such that the fifth line of the image receiving medium 10c, having the fifth line of the image source imprinted thereon, coincides with the fourth scan line 10/4 in lieu of the first lowermost scan line 10/5. A new line of image information, the sixth line of the image source, is transferred to the sixth line of the image receiving medium, via the fifth scan line 10/5. The fifth line of the image source is again transferred to the fifth line of the image receiving medium 10c, however, it is transferred via the fourth scan line 10/4. The image transferred to the fifth line of the image receiving medium via the fourth scan line 10/4 is superimposed over the image transferred to the fifth line of the image receiving medium via the lowermost scan line 10/5. Similarly, the fourth through the second lines of the image source are again transferred to the fourth through the second lines of the image receiving medium via the third through the first scan lines 10/3–10/1.

It should be noted that imperfections may exist on the inner faceplate of the fiber optic CRT (and in the fiber optic faceplate itself) along the first scan line 10/1. When the electron beam scans across these imperfections on the fifth scan line 10/5, blank spots or gaps may appear at the corresponding locations along the fifth line of the image receiving medium. However; when the fifth line of the image source is transferred to the fifth line of the image receiving medium via the fourth scan line 10/4, due to the absence of similar imperfections along said fourth scan line 10/4, the visual effect of said blank spots or gaps on said image receiving medium is minimized, if not eliminated.

Since the image information associated with each of the lines of the image source is repeatedly transferred to the image receiving medium via each of the five scan lines, the streaks 10e, appearing on the image receiving medium 10c, of FIG. 1b, gradually disappear.

It was stated, with reference to FIG. 1c, that the image information associated with one line of the image source is successively and repeatedly transferred to one line of the image receiving medium 10c via each of the multiple number of scan lines 10f traced on the inner faceplate of the fiber optic CRT 10. To further illustrate this concept, reference is directed to FIGS. 2a–2d of the drawings.

As stated hereinabove, the image source is scanned, line-by-line, and signals are generated therefrom representative of the image information associated with each line of the image source. The image information, associated with each line of the image source, is stored in a respective number of line locations of an "N"-line memory. Referring to FIGS. 2a–2d, a four-line memory 12 is illustrated as having stored therein image information associated with four lines of the image source. Assume that line number 197 is stored in a first line location of the four-line memory 12 of FIG. 2a and represents the image information associated with the 197th line of the image source. Line number 198 is stored in a second line location of the four-line memory 12 and represents the image information associated with the 198th line of the image source. Line number 199 is stored in the third line location of the four-line memory 12 and represents the image information associated with the 199th line of the image source. Similarly, line numbers 200, and 201 represent the image information associated with the 200th and 201st lines of the image source.

A pointer 14 reads the image information from the four-line memory 12 by sequentially addressing the third, second, and first line locations of memory 12, as indicated by the arrow 16. For example, in FIG. 2a, when the pointer 14 addresses the third line location of memory 12, the image information of line number 199 is read therefrom.

When the pointer 14 addresses the second line location of memory 12, the image information of line number 198 is read therefrom. Similarly, in FIG. 2a, when the pointer 14 addresses the first line location of memory 12, the image information of line number 197 is read therefrom.

As the pointer 14 addresses the memory 12 in FIG. 2a, in the direction of arrow 16, the image information of lines number 199, 198, and 197 is sequentially read therefrom. This image information is converted to electrical signals. As stated hereinabove, the fiber optic CRT 10 utilizes an electron beam to trace a multiple number of scan lines on the inner faceplate thereof. The electrical signals determine the intensity of the electron beam while the beam traces the multiple number of scan lines. As the image information of line number 199 is read, it is transferred to the third line on the image receiving medium 10c via the lowermost scan line 10/3, as shown in FIG. 2a. Line number 198 is transferred to the second line on the image receiving medium via the next lowermost scan line 10/2. Finally, line number 197 is transferred to the first line on the image receiving medium 10c via the scan line 10/1. At this point, three lines of image information are disposed on the image receiving medium, corresponding to the image information associated with the 199th, 198th, and 197th line of the image source, respectively.

The image information associated with the 200th line of the image source, is written into the fourth line location of the N-line memory 12.

The pointer 14 is reset to a position adjacent the fourth line location of the N-line memory 12, as shown in FIG. 2b. The image receiving medium scrolls across the face of the fiber optic CRT until the line number "198" image information imprinted thereon, the line of image information associated with the second line of the image source, previously coinciding with the intermediate scan line 10/2, coincides with the uppermost scan line 10/1.

Still referring to FIG. 2b, the pointer 14 again addresses the memory 12 in the direction of arrow 16. However, in FIG. 2b, the 200th, 199th, and 198th line locations of memory 12 are sequentially addressed. The image information associated with the 200th, 199th, and 198th lines of the image source, are sequentially read from memory 12. The content of lines number 200, 199, and 198 image information, is sequentially transferred to the 200th, 199th, and 198th lines of the image receiving medium via the scan lines 10/3, 10/2, and 10/1, respectively. The image information associated with the 198th line of the image source is transferred to the 198th line of the image receiving medium, superimposed over the the image information previously transferred to the 198th line of the image receiving medium. The image information associated with the 199th line of the image source, is transferred to the 199th line of the image receiving medium, superimposed over the image information previously transferred to the 199th line of the image receiving medium. The image information associated with the 200th line of the image source, was not previously transferred to and imprinted on the image receiving medium.

The image information associated with the 200th line of the image source, is written into the first line location of the N-line memory 12.

In FIG. 2c, the pointer 14 is again reset. However, in this figure, the pointer initially addresses the first line location in memory 12, and sequentially addresses the first, fourth, and third line locations. The image information associated with the 201st, 200th, and 199th lines of the image source, is stored therein. The image receiving medium scrolls across the face of the fiber optic CRT in a similar manner as mentioned hereinabove such that the image information printed on the image receiving medium, associated with the 199th line of the image source, previously adjacent scan line 10/2, is now adjacent scan line 10/1. The pointer addresses the first, addresses the fourth and third line locations of the 4-line memory 12 in the direction of arrow 16, shown in FIG. 2c. The image information associated with the 201st, 200th, and 199th lines of the image source is sequentially transferred to the image receiving medium 10c via the scan lines 10/3, 10/2, and 10/1, respectively. The image information associated with the 200th and 199th line of lines of the image source, is superimposed over the 200th and 199th lines of image information previously transferred to the 200th and 199th lines on the image receiving medium.

Note that the image information associated with the 199th line of the image source is transferred to the image receiving medium 10c via the lowermost scan line 10/3 in FIG. 2a. The 199th line is again transferred via the intermediate scan line 10/2 in FIG. 2b, and is again transferred via the uppermost scan line of 10/1 in FIG. 2c.

The process is again repeated in FIG. 2d. The image information associated with the 202nd line, is written into the second line location of memory 12. The pointer 14 initially addresses the second line location, and sequentially addresses the second, first, and fourth line locations of memory 12. The 202nd, 201st, and 200th image information is sequentially transferred to the image receiving medium via scan lines 10/3, 10/2, and 10/1.

Consequently, each line of the image source will be transferred to a corresponding line on the image receiving medium a plurality of times via each of the scan lines traced on the inner faceplate of the fiber optic CRT. Therefore, even though imperfections exist at specific locations along one scan line, another similar imperfection will most likely not exist at the same corresponding specific location along another scan line. As a result, the visual effect of the blank spot or gap appearing at the corresponding location on the image receiving medium, as a result of a scan along said one scan line, will be dulled or minimized, if not eliminated, following a scan along said another and subsequent scan lines. The visual effect of other blank spots or gaps, created as a result of other imperfections existing along said one scan line, will also be dulled or minimized, if not eliminated, following a scan along said another and subsequent scan lines. Therefore, the problem with the prior art, shown in FIG. 1b, wherein streaks 10e appear on the image receiving medium 10c, will be minimized if not eliminated as a result of the utilization of the present invention.

The structure utilized to implement the multi-line scanning technique of the present invention is illustrated in FIG. 3 of the drawings. The image source, such as a facsimile device, is connected to an A to D converter (ADC) 20 for converting incoming analog signals, representative of the image on each one of the image source, to digital signals. The output of the A to D converter 20 or digital signal from image source is connected to a latch circuit 22, the latch circuit receiving and temporarily storing therein the digital signals representative of the image information on each picture element (pixel) of the image source. The output of the latch circuit 22 is connected to an N-line memory 24. The N-line memory 24 corresponds to the four-line memory shown in FIGS. 2a–2d and includes a plurality of line locations for storing therein the image information associated with a multiple number of lines (N-lines) of the image source. The output of the N-line memory 24 is connected to a latch circuit 26, the latch circuit 26 receiving and temporarily storing therein the digital signals representative of the image information associated with each pixel of each line of the image source, as read from each pixel location associated with each line location of the N-line memory 24. The output of the latch circuit 26 is connected to a D to A converter (DAC) 28 for converting the digital signals received from the latch circuit 26 into analog signals, the analog signals energizing the electron guns of a CRT 30, e.g., a fiber optic CRT for determining the brightness of the image transferred to the image receiving medium.

A timing and control circuit 32 is connected to the ADC 20, the latch circuit 22, the N-line memory 24, and the latch circuit 26 for controlling the digitizing of the analog signals from the image source, for controlling the storage of the digital signals in the latch circuit 22, for controlling the writing of the digital signals into the N-line memory 24 and the reading of the digital signals therefrom, for addressing various locations within the N-line memory 24, and for controlling the storage of the digital signals read from the N-line memory 24 in the latch circuit 26. The timing and control circuit 32 also generates the X axis and Y axis deflection signals for appropriately deflecting the electron beam within the fiber optic CRT 30.

In operation, the ADC 20 receives the analog signals representative of the image information on each line of the image source, and converts these analog signals to digital signals. The timing and control circuit 32 enables the latch circuit 22, the latch circuit sequentially storing therein the digital information associated with each pixel of each line of the image source in response to an output signal from the timing and control circuit 32. When the digital signal representing a pixel is stored in the latch circuit 22, the timing and control circuit 32 energizes the "write/read" terminal of the N-line memory to initiate a write mode. The timing and control circuit 32 addresses the N-line memory 24 for selecting a line location and a pixel location along the selected line location wherein the digital signals, temporarily stored in the latch circuit 22, are transferred to and stored within the selected pixel location. In response to the energization of the "write/read" terminal of the N-line memory 24, to indicate the "write" mode, and in response to the addressing of the N-line memory 24 performed by the timing and control circuit 32, the digital signal stored in the latch circuit 22 is further stored within the selected pixel location along the selected line location of the N-line memory 24.

Assume that the digital signals representative of the image information associated with the first through the Nth lines of the image source are stored in the first through the Nth line locations, respectively, of the N-line memory 24. The timing and control circuit 32 energizes the "write/read" terminal of the N-line memory, to indicate a "read" mode. The timing and control circuit 32 instructs the pointer 14 to sequentially address the line locations of the N-line memory in the manner illustrated in FIGS. 2a–2d of the drawings. The scanning technique described with reference to FIGS. 2a–2d is performed. Digital signals are generated therefrom representative of the image information stored in each pixel of each line location of the N-line memory.

Since an 'N' line memory (24) is used, 'N−1' scan lines are traced on the fiber optic CRT for transferring the image information stored in 'N−1' line-locations of the N-line memory to the image receiving medium. One line location of the N-line memory 24 is a storage location for storing therein the image information associated with a new line of the image source.

The digital signals generated from the N-line memory are stored, sequentially, in serial fashion, in the latch circuit 26, and are converted to an analog signal via the DAC 28. The analog signal energizes the electron gun of the CRT 30 for determining the brightness of each pixel on each line of the image source transferred to the image receiving medium. Simultaneously and in synchronism with the development of these analog signals, the timing and control circuit 32 develops the X and Y axis deflection signals for energizing the appropriate X and Y coils in the deflection yoke.

Figure 4:
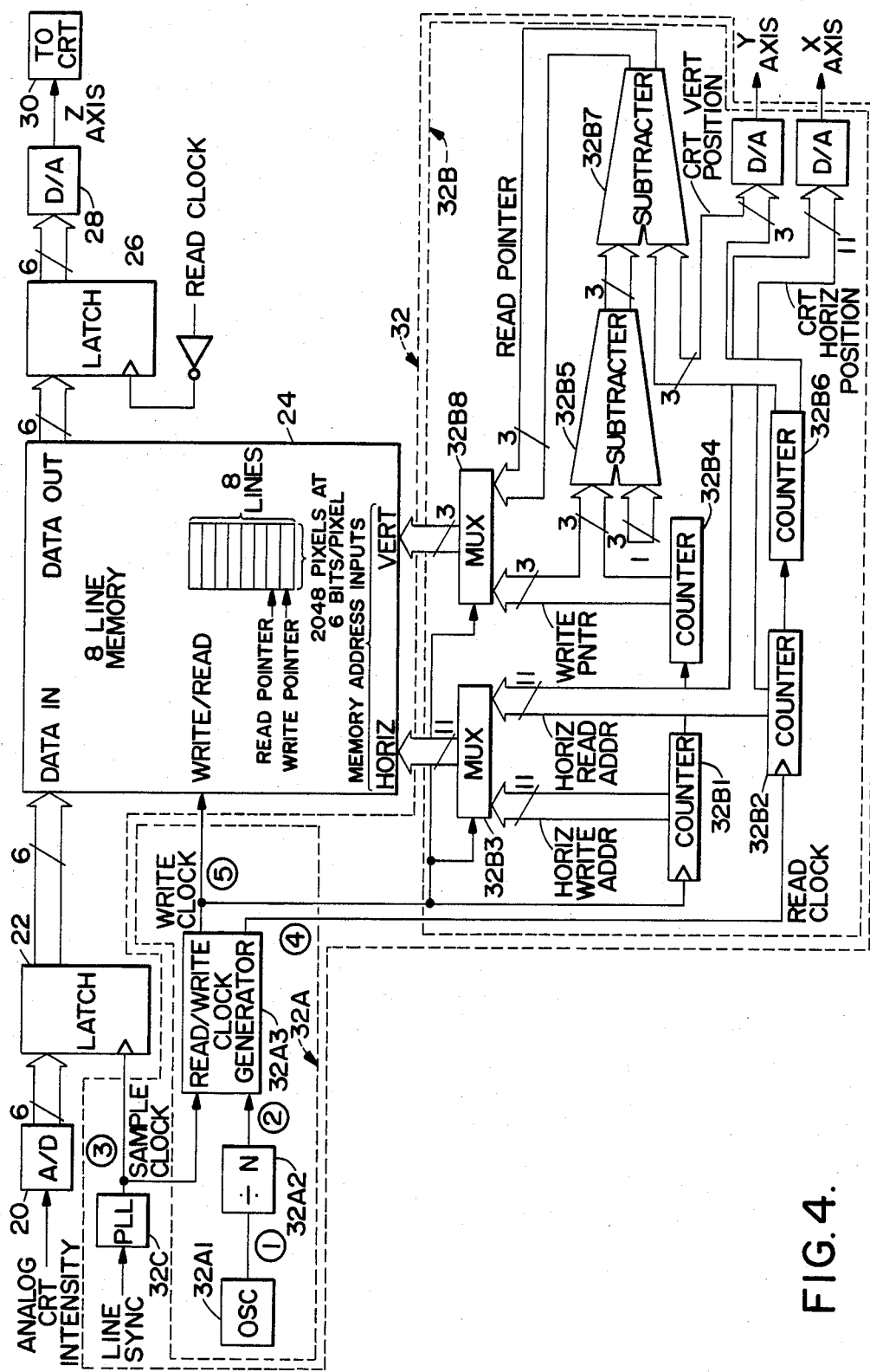
FIG. 4 illustrates a more detailed system block diagram of the present invention.

A more complete and thorough understanding of the operation of the system block diagram of FIG. 3 will be obtained with reference to FIG. 4 of the drawings of the present application.

Figure 5:
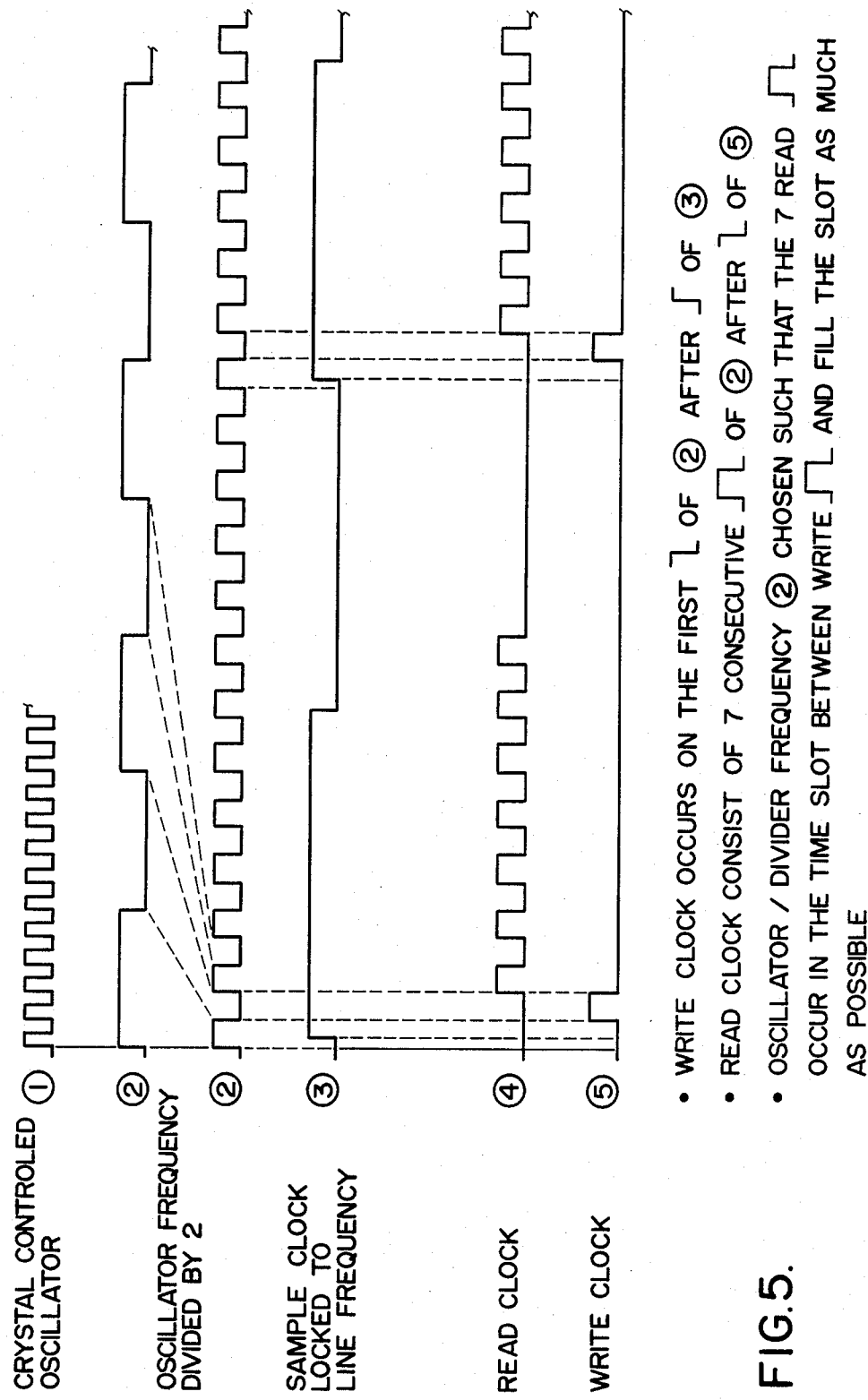
FIG. 5 illustrates the voltage waveforms generated within a portion of the block diagram shown in FIG. 4 inclusive of the read clock and the write clock.

In FIG. 4, an eight-line memory 24 is illustrated. One line location of the eight-line memory is a storage location for storing the image information associated with the new line of the image source being written into the eight-line memory. The remaining line locations of the eight-line memory represent storage locations for storing the image information associated with the lines of the image source previously written into the eight-line memory. In FIG. 4, a detailed construction of the timing and control circuit 32 of FIG. 3 is illustrated. The timing and control circuit 32 shown in FIG. 4 includes a clock signal generating circuit 32a for generating read clock signals and write clock signals. FIG. 5 illustrates the read clock and write clock signals which are generated by the clock signal generating circuit 32a. The clock signal generating circuit 32a includes an oscillator 32a1 and a divide-by-N counter 32a2 connected at the output end thereof. The junction between the oscillator 32a1 and the counter 32a2 is designated as junction 1. The output of the counter 32a2 is designated as junction 2. Junction 2 is connected to one input terminal of a read/write clock generator 32a3. One output of the read/write clock generator 32a3 is designated as junction 4. The other output of the read/write clock generator 32a3 is designated as Junction 5. Junction 4 generates the read clock signals. Junction 5 generates the write clock signals. The other input terminal of the read/write clock generator 32a3 is designated as Junction 3. Reference is directed to FIG. 4 of the drawings wherein each of the junctions 1-5 are shown and marked within the clock signal generating circuit 32a. Reference is further directed to FIG. 5 of the drawings wherein the voltage waveforms at each of these junctions 1-5 within the clock generating circuit 32a are illustrated.

The timing and control circuit 32 shown in FIG. 4 further includes an addressing circuit 32b for providing the appropriate horizontal and vertical memory address inputs to the eight-line memory 24 in response to the read clock and the write clock signals generated by the clock generating circuit 32a. The addressing circuit 32b further includes a first counter 32b1 responsive to the write clock for generating horizontal write address signals. It also includes a second counter 32b2 responsive to the read clock for generating horizontal read address signals. A first multiplexer 32b3 is responsive to the horizontal write and read address signals from the first counter 32b1 and the second counter 32b2, respectively, for developing addressing signals, input to the eight-line memory 24, the addressing signals consisting of either the horizontal write address signals from the first counter 32b1 or the horizontal read address signals from the second counter 32b2. The first multiplexer 32b3 is nothing more than a switch, responsive to the signal energizing the "write/read" terminal of the eight-line memory 24, originating from the read/write clock generator 32a3, for selecting either the horizontal write address signals from the first counter 32b1 or the horizontal read address signal from the second counter 32b2. If the signal energizing the "write/read" terminal of the eight-line memory 24 is indicative of the "write" mode, the first multiplexer 32b3 selects the horizontal write address signals from from the first counter 32b1. If the signal energizing the "write/read" terminal of the eight-line memory 24 is indicative of a "read" mode, the first multiplexer 32b3 selects the horizontal read address signals from the second counter 32b2.

The addressing circuit 32b further includes a third counter 32b4, responsive to the output from the further counter 32b1 for generating an addressing signal indicative of a selected line location of the eight-line memory 24. The addressing signal generated by the third counter 32b4 represents the write pointer shown in FIG. 4.

The addressing circuit 32b also includes a first subtractor 32b5 connected to the output of the third counter 32b4 and responsive to the value "1" for adding the value "1" to the output of the third counter 32b4. A fourth counter 32b6 is responsive to the output of the second counter 32b2 for incrementing its value by 1 each time the second counter 32b2 counts to a value "2047" indicative of 2048 pixels on a line. A second subtractor 32b7 is connected to the output of the first adder 32b5 and to the output of the fourth counter 32b6 for adding the output of the first adder 32b5 to the output the fourth counter 32b6 and generating an output signal indicative of that sum. The output of the subtractor 32b7 represents the read pointer 14 shown in FIGS. 2a-2d and shown in FIG. 4. The output of the fourth counter 32b6 is also connected to the input of a first D to A converter (DAC1), the DAC1 generating the Y axis deflection signals shown in FIG. 3. The output of the second counter 32b2 is also connected to the input of a second D to A converter (DAC2), the DAC2 generating the X axis deflection signals shown in FIG. 3.

A second multiplexer 32b8 is responsive to the addressing signal from the third counter 32b4 and to the output from the second subtractor 32b7 for selecting either the output from the third counter 32b4 or the output from the second subtractor 32b7 in response to the signal energizing the "write/read" terminal of the eight-line memory 24. The second multiplexer 32b8 will select the output of the third counter 32b4 when the "write/read" terminal of the eight-line memory 24 has a "write" signal applied thereto. This second multiplexer 32b8 will, on the other hand, select the output of the second subtractor 32b7 when the "write/read" terminal the eight-line memory has a "read" signal applied thereto. The output of the first multiplexer 32b3 represents the horizontal memory address input. The output of the second multiplexer 32b8 represents the vertical memory address input.

Figure 6:
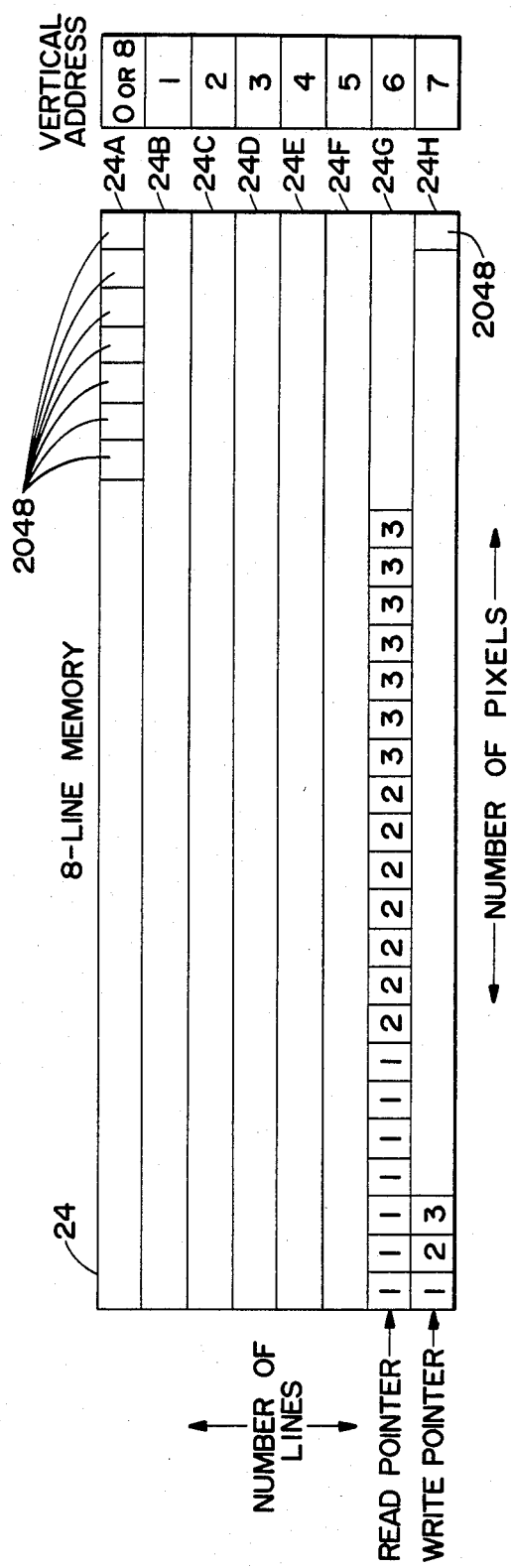
FIG. 6 illustrates the manner by which the block diagram of FIG. 3 or 4 performs the function of the present invention.

In order to understand the operation of the system block diagram shown in FIG. 4, reference is directed to FIG. 6 of the drawings of the present application.

In FIG. 6, the eight-line memory 24, as shown in FIG. 4, is illustrated. Assume that the lower most line location 24h of the eight-line memory 24 shown in FIG. 6 is the memory location wherein a new line of image information from the image source is to be written into the eight-line memory 24. Assume that the eighth line of the image source is to be written into the eight-line memory 24. Based on this assumption, the image information associated with the eighth line of the image source would be written into the eighth line location 24h of the eight-line memory 24. The image information associated with the seventh, sixth, fifth, fourth, third, second, and first lines of the image source would be stored in the seventh 24g, sixth 24f, fifth 24e, fourth 24d, third 24c, second 24b, and first 24a line locations, respectively, of the eight-line memory 24.

Still referring to FIG. 6, the image information associated with a maximum of 2048 pixels for each line of the image source can be stored within each line location of the eight-line memory 24.

The circuit of FIG. 4 has associated therewith a write cycle/read cycle wherein a new line of the image source is written into the memory 24 substantially simultaneously with the reading of a previously written line from the memory 24. The write cycle/read cycle of FIG. 4, that is, the manner in which the circuit of FIG. 4 writes the image information associated with each pixel of the new line of the image source into the eighth line location 24h of the eight-line memory 24 and the manner by which it reads the image information associated with the previously written lines of the image source from the seventh through the first line locations (24–24a), will now be described in the following paragraphs and illustrated with reference to FIG. 5 and FIG. 6 of the drawings.

In FIG. 5, intermediate each of the write clock pulses, there are seven read clock pulses. With reference to FIG. 6, the image information associated with the first pixel (1) of the new line of the image source is written into the eighth line location 24h of the eight line memory in response to the generation of a write clock pulse. Following this step, seven read clock pulses are generated in succession, prior to the generation of the next write pulse. Therefore, the image information associated with seven pixels of a previously written line of the image source (1111111) will be read, in succession, from the seventh line location 24g shown in FIG. 6. When the next write pulse is generated, the image information associated with the second pixel (2) of the new line of the image source will be written into the eighth line location 24h shown in FIG. 6. This will be followed by the generation of seven read pulses in succession wherein the image information associated with the next seven pixels of the previously written line of the image source (2222222) will be read, in succession, from the eighth line location 24g shown in FIG. 6. When the third write pulse is generated, the image information associated with the third pixel (3) of the new line of the image source will be written into the eighth line location 24h shown in FIG. 6. This will be followed by the generation of seven more read pulses wherein the image information associated with the next subsequent seven pixels of the previously written line of the image source (3333333) will be read, in succession, from the seventh line location 24g shown in FIG. 6.

This write cycle/read cycle will repeat until the image information associated with the 2048th pixel of the new line of the image source is written into the last pixel position within the eighth line location 24h of the eight-line memory. This will be followed by a final step, wherein the image information associated with the last seven pixels of a previously written line of the image source (2048 . . . 2048) stored in the first line location 24a of the eight-line memory will be read therefrom.

When the above write cycle/read cycle is complete, the write pointer will write a new line of image information into the first (in lieu of the eighth) line location 24a. The read pointer will be reset to a different line location and will sequentially address the line locations of the eight-line memory 24 in the manner illustrated in FIGS. 2a–2d of the drawings. At this point, the write/read cycle will repeat until all of the lines of the image source have been introduced into the eight line memory 24 and read therefrom.

Bearing in mind this functional description of the read cycle/write cycle associated with the circuit shown in FIG. 4, with reference to FIG. 6, a following more detailed functional description of FIG. 4 will be provided in the paragraphs to follow.

The following description will assume that the image information associated with the first seven lines of the image source have already been written into the eight line memory 24 and now occupy line locations 24a–24g, as shown in FIG. 6. Furthermore, the description will assume that the write and read pointers should be reset to a position adjacent the eighth and seventh line locations 24h and 24g, respectively. The new image information, associated with the eighth line of the image source, is about to be written into the eighth line location 24h.

As the eighth line of the image source is scanned, analog signals are received representative thereof. These analog signals are input to the ADC 20 shown in FIG. 4. A line sync pulse is generated for each line of the image source. When this line sync pulse is generated, it energizes the input terminal of a phase-locked loop circuit 32c. The phase locked loop circuit 32c generates a series of sample clock pulses, the sample clock pulses energizing the Junction 3 input terminal of the read/write clock generator 32a3. There are 2048 sample clock pulses generated for each line of the image source, one sample clock pulse for each pixel on each line of the image source being scanned. These sample clock pulses place the information existing on the six digital output lines on the ADC 20 in the latch 22 where they are temporarily stored until they are written into the correct position in memory 24 by the following write clock pulse. In our example, 2048 samples will be taken per line and temporarily stored in latch circuit 22. In response to a sample clock pulse, the read/write clock generator 32a3 will generate a write clock pulse, the write clock pulse energizing the WRITE/READ terminal of the eight-line memory 24 thereby indicating that the system is in a "write" mode. The first multiplexer 32b3 will be switched in such a way that the output of the first counter 32b1 is connected to the horizontal memory address input terminal of the eight-line memory 24. The second multiplexer 32b8 will also be switched in such a way that the output of the third counter 32b4 will be connected to the vertical memory address input terminal of the eight-line memory 24. The output of the second counter 32b2 will not be connected to the horizontal memory address input. Similarly, the output of the second subtractor 32b7 will not be connected to the vertical memory address input.

When the write clock pulse is generated, switching the system to the "write" mode, the generated write clock pulse energizes the first counter 32b1. The output of the third counter 32b4 indicates that the eighth vertical memory address input of the eight-line memory, that is, the eighth line location 24h is addressed. The output of the first counter 32b1 indicates the horizontal memory address. When the first write pulse energizes the first counter 32b1, the counter resets to 0. The address associated with the eighth line location 24h of the eight-line memory will be indicated by the vertical memory address input and the address associated with the first pixel of the eighth line location will be indicated by the horizontal memory address input. For each write clock pulse, energizing counter 32b1, another adjacent pixel of the first line location will be addressed.

However, intermediate each of the write clock pulses, seven read clock pulses will be generated, as can be seen in FIG. 5. Therefore, when the write clock pulse drops from a high to a low voltage level, simultaneously with the increase of the read clock pulse from a low to a high voltage level, as seen in FIG. 5, the system block diagram of FIG. 4 switches from a "write" to a "read" mode. The "write/read" input terminal of the eight-line memory 24 is now energized by a zero voltage level. In response thereto, the multiplexers 32b3 and 32b8 switch to the alternate switched position such that the output of the second counter 32b2 is now connected to the horizontal memory address input terminal of the eight-line memory 24, and the output of the second subtractor 32b7 is connected to the vertical memory address input terminal of the eight-line memory 24. The output of the first counter 32b1 is not connected to the horizontal memory address input, and the output of the third counter 32b4 is also not connected to the vertical memory address input terminal of the eight-line memory 24. The generation of the first read clock pulse, following the generation of the write clock pulse, resets the second counter 32b2 to value 0. This provides a value "0" for the horizontal memory address input corresponding to the first pixel. However, note that the third counter 32b4 remains at a value "7" indicating the eighth line location of the eight-line memory. The value "1" is also inputted to the subtractor 32b5 is subtracted from the value "7", in the first subtractor 32b5, such that the output of the first subtractor 32b5 is the value "6". This value "6" represents one of the two inputs to the second subtractor 32b7. The fourth counter 32b6 remains at a value "0".

The output of the fourth counter 32b6 will remain at the value "0" until the counter 32b2 counts to the value 2047, indicating the last pixel on the seventh line location undergoing the read cycle. When the counter 32b2 counts to the value 2048, (equivalent to the value 0) an output will be generated therefrom for incrementing the counter 32b6. This new number is subtracted in the subtractor 32b7 from the output of adder 32b5 to give a new line number, in this case 6−1=5 or the sixth line.

When the first seven pixels of the seventh line location 24g are being read from the eight-line memory 24, the output of the fourth counter 32b6 is at "0". Consequently, the output of the second subtractor 32b7 will indicate the value "6". This value will represent the vertical memory address input to the eight-line memory 24, that is, the second line location. Since the counter 32b2 indicates the value "0", the first pixel of the seventh line location 24g will be addressed for reading therefrom the image information contained therein. This image information, stored in the first pixel of the seventh line location 24g, will be read from the eight-line memory and stored in the latch circuit 26 when the latch circuit 26 is energized by the read clock pulse. This digital information is converted to analog information via the DAC 28. This analog information energizes the electron guns of the fiber optic CRT by way of an analog gate for determining the intensity of the electron beam generated therefrom at an instant when the beam position corresponds to the first pixel of the second line location.

When another read clock pulse energizes the second counter 32b2, the second counter 32b2 is incremented from a value 0 to a value 1 indicative of the second pixel. Since the second counter 32b2 has not yet reached the value "2048" or "0", the output of the fourth counter 32b6 remains at the value "0", and the vertical memory address input to the eight-line memory remains at the value "6", indicating the seventh line location. At this point, the seventh pixel of the second line location 24g of the eight-line memory 24 is addressed, and since the system is in the "read" mode, the digital image information contained within the second pixel of the seventh line location of the eight-line memory 24 is read therefrom. This digital image information is stored in the latch circuit 26 when the latch circuit 26 is energized by the read clock pulse and is converted to an analog signal via the DAC 28. The analog signal energizes the electron gun of the fiber optic CRT for determining the intensity of the electron beam at an instant when the beam position corresponds to the second pixel of the seventh line location 24g.

When the next five read clock pulses energize the counter 32b2, the next five sequential pixels of the seventh line location 24g of the eight-line memory 24 will be addressed, the image information contained therein being read therefrom and converted to analog information via the DAC 28 for determination of the intensity of the electron beam at an instant when the beam position corresponds to the next five sequential pixels of the second line location.

When the next sequential write clock pulse is generated, the system switches from the "read" mode to the "write" mode. The signal energizing the "write/read" terminal of the eight-line memory 24 will therefore change from a low voltage level to a high voltage level. In response to this high signal applied to the "write/read" terminal, the multiplexers 32b3 and 32b8 are switched again to their original positions wherein multiplexer 32b3 connects the output of the first counter 32b1 to the horizontal memory address input, and the multiplexer 32b8 connects the output of the third counter 32b4 to the vertical memory address input of the eight-line memory 24. The write clock pulse increments the counter 32b1 from a value 0 to a value 1. The counter 32b4 remains at its value "7". Consequently, the output of the first subtractor 32b5 remains at a value "6".

Since the output of the third counter 32b4 remains at a value 7, the eighth line location 24h of the eight-line memory 24, representing the vertical memory address input, is addressed. Since the output of the first counter 32b1 now indicates a value of "1", the second pixel of the eighth line location 24h is addressed. Consequently, the next sequential digital value is retrieved from the latch circuit 22, and is stored in the second pixel location of the eighth line location 24h of the eight-line memory 24.

At the instant that the write clock pulse drops to a low voltage level, a read cycle will commence in the manner hereinbefore described, wherein the next seven read clock pulses are generated by the read/write clock generator 32a3 for reading out the digital image information located in the next seven pixel locations of the first line location 24a of the eight-line memory 24. This digital image information is converted to analog image information via the DAC 28.

When the image information associated with the 2048th pixel of the new line of the image source is written into the last pixel location of the first line location 24a of the eight-line memory 24, the count of the first counter 32b1 will be 2047. At this point, the system switches to the "read" mode, wherein the image information associated with the last seven pixel locations of the first line location 24a of the eight-line memory is read therefrom and converted to analog information via the DAC 28, the analog information energizing the electron guns of the fiber optic CRT via an analog gate. At this point, the value in the second counter 32b2 will be 2047. The vertical memory address input, the output of the second subtractor 32b7, will be the value "0". The value in the fourth counter 32b6 will be the value "6". The eighth line of the image source has been completely written into the eighth line location 24h of the eight-line memory. The image information associated with the first seven lines of the image source, assumed to be contained in the first through the seventh line locations 24a through 24g of the eight-line memory 24, have been read therefrom and converted to analog signals via DAC 28.

At this point, the write and read pointers are reset, and the entire write/read cycle, as described hereinabove, repeats once again.

Figure 7A:
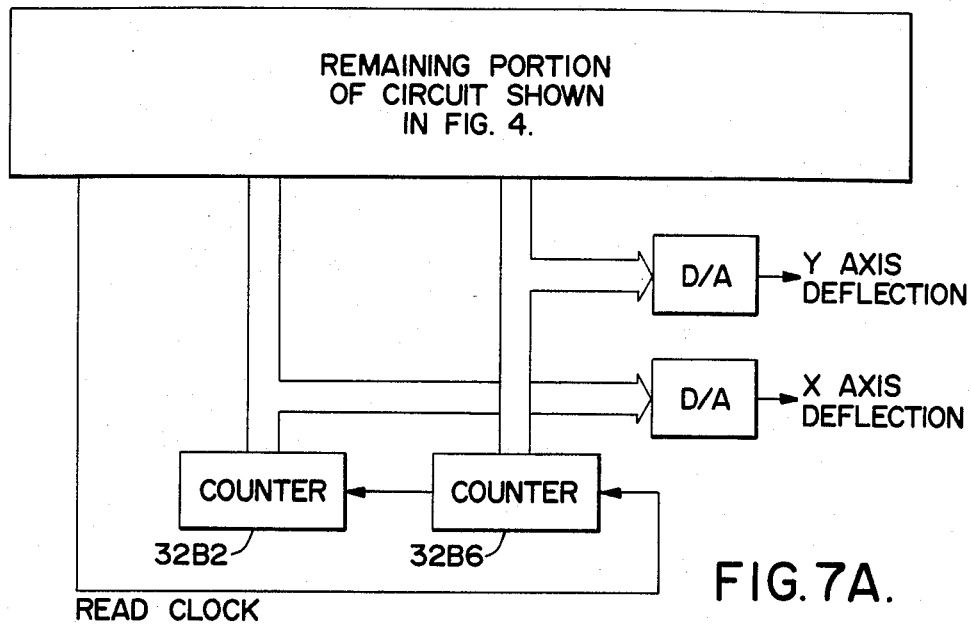
FIGS. 7a–7b illustrate an alternative embodiment of the present invention.

Referring to FIG. 7a of the drawings, an alternative embodiment of invention is illustrated. FIG. 7a should be read in conjunction with FIG. 4, since FIG. 7a illustrates only the portion of FIG. 4 which has been modified by virtue of the alternative embodiment of invention. The remainder of the circuit not shown in FIG. 7a is the same as the circuitry shown in FIG. 4.

In FIG. 7a, note that the output of the read/write clock generator 32a3 is connected to the input of the fourth counter 32b6, wherein the read clock pulse energizes the input of the fourth counter 32b6. The output of the fourth counter 32b6 is connected to the input of the second counter 32b2. This is contrary to FIG. 4, wherein the output of the second counter 32b2 is connected to the input of the fourth counter 32b6, the read clock energizing the second counter 32b2.

The following write/read cycle will be utilized by the alternative embodiment of invention shown in FIG. 7a.

Figure 7B:
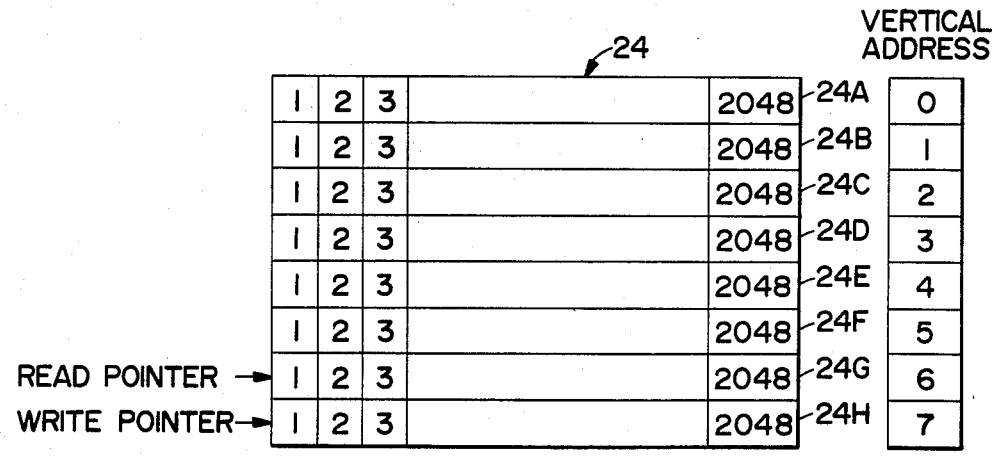

Referring to FIG. 7b, the image information associated with the first pixel of a new line of the image source is written into the first pixel location of the eighth line location 24h of the eight-line memory 24. The image information, located in the first pixel location of each of the seventh through the first line locations 24g through 24a of the eight-line memory 24, is sequentially read therefrom. The image information associated with the second pixel of the new line of the image source is written into the second pixel location of the eighth line location 24h. The image information located in the second pixel location of each of the seventh through the first line locations 24g through 24a of the eight-line memory 24 is sequentially read. This write/read cycle repeats until the last pixel location is encountered, the image information associated with the last pixel of the new line of the image source being written into the last pixel location 2048 of the eighth line location 24h. Then, the image information located in the last pixel location 2048 of each of the seventh through the first line locations 24g through 24a of the eight-line memory is sequentially read therefrom.

The invention being thus described, it is obvious that the same may be varied in many ways. Such variations are not to be regarded as a departure from the spirit and scope of the invention and all such modifications as would be obvious to one of ordinary skill in the art are intended to be included within the scope of the following claims.

I claim:

1. A method of transferring image information associated with at least one line of an image from an image source to an image receiving medium, comprising the steps of:

recording the image information associated with said one line of said image through a first information transmission path onto a line of said image receiving medium; and re-recording the image information associated with said one line of said image through a second information transmission path onto said line of said image receiving medium;

whereby the quality of the image disposed on said line of said image receiving medium representing the image information associated with said one line of said image source is improved following the re-recording step.

2. The method of claim 1 further comprising the steps of:

further recording the image information associated with other lines of said image onto other corresponding lines of said image receiving medium, the further recording step being performed subsequent to the performance of said recording step and prior to the performance of the re-recording step; and further re-recording the image information associated with said other lines of said image onto said other corresponding lines of said image receiving medium, the further re-recording step being performed following the performance of the re-recording step.

3. The method of claims 1 or 2 wherein:

said image information is recorded onto said line of said image receiving medium via a first scanline traced across the inner faceplate of a cathode ray tube; and said image information is re-recorded onto said line of said image receiving medium via a second scan line traced adjacent the trace of said first scan line across the inner faceplate of said cathode ray tube.

4. An image transfer apparatus capable of transferring at least one line of an image from an image source to an image receiving medium, comprising:

first means for generating a signal indicative of the image information associated with said one line of said image source;

second means responsive to said signal for recording said image information onto a line of said image receiving medium;

said first means re-generating said signal indicative of said image information associated with said one line of said image in response to the completion of the recording performed by said second means; and said second means re-recording said image information onto said line of said image receiving medium in response to the signal re-generated by said first means.

5. An image transfer apparatus in accordance with claim 4 wherein said first means generates a further control signal for controlling the recording performed by said second means; and wherein said second means further comprises a cathode ray tube including an electron beam generating means for generating an electron beam, said electron beam tracing a plurality of scan lines on the inner surface of said tube in response to said further control signal generated by said first means, said line of said image receiving medium being scrolled across the face of said cathode ray tube in synchronism with the tracing of each of said plurality of scan lines on the inner surface thereof, the electron beam of said second means recording said image information onto said line of said image receiving medium via the trace of one of said plurality of scan lines in response to said signal, and the electron beam of said second means re-recording said image information onto said line of said image receiving medium via the trace of another of said plurality of scan lines in response to the regenerated signal.

* * * * *